G. K. FARRINGTON.
Churn.
No. 21,637. Patented Sept. 28, 1858.
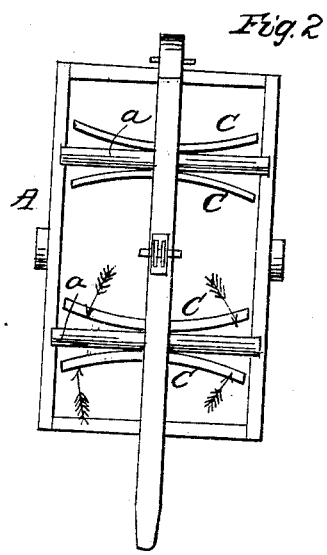
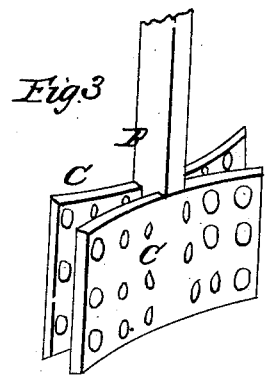
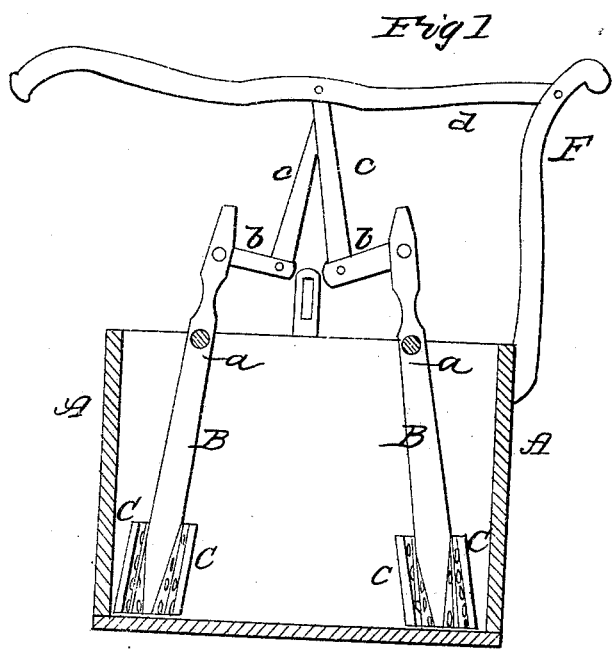
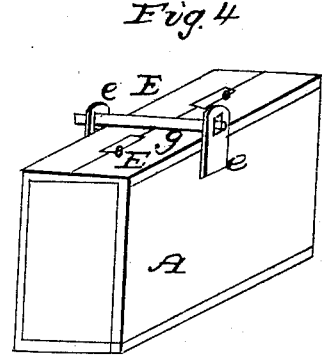

UNITED STATES PATENT OFFICE.

GEO. K. FARRINGTON, OF XENIA, OHIO, ASSIGNOR TO D. B. TIFFANY, OF SAME PLACE.

CHURN.

Specification of Letters Patent No. 21,637, dated September 28, 1858.

*To all whom it may concern:*

Be it known that I, G. K. FARRINGTON, of Xenia, in the county of Greene and State of Ohio, have invented certain new and useful Improvements in Churns; and I do hereby declare that the following is a full and clear description of the same, reference being had to the accompanying drawings and to the letters of reference marked thereon.

The nature of my invention consists in the arrangement of the double concavo-convex dashers in the manner which will be hereinafter described.

In order that those skilled in the arts may use and manufacture my invention I will proceed to describe its construction and operation.

In the annexed drawings Figure 1 is a side elevation with one side removed. Fig. 2 is a plan view with the top removed. Fig. 3 is a perspective view of one dasher and dasher bearer, the dasher bearer being shown only in part. Fig. 4 is a perspective view of the box.

In the several figures A represents the box, which serves to hold the cream.

B, B, are the dasher bearers, which are secured to the shafts $(a, a,)$—these shafts $(a, a,)$ pass through the bearers and have their bearings in the sides of the box.

C, C, are the double concavo-convex dashers, being two dashers, which are concave on one side, and convex on the other—the convex sides being secured to the bearers (B, B,) as shown in the figures. The dashers are provided with holes, and these holes pass straight through with reference to the curvature of the dashers, so that when the dashers are operated, and the cream is agitated it passes through the dashers, and passes in the direction shown by the arrows in the drawings—breaking on the sharp edges of the holes in the dashers, as will be readily seen, thus producing a very desirable effect on the cream.

$(b\ b)$ are arms secured firmly to the dasher bearers, and $(c, c,)$ are connecting bars, connecting said arms to the lever, $d$.

$(d)$ is a lever, one end of which is secured to the upright F, the other end being free is operated upon by the hands, in churning. The bars $(c\ c)$ are connected to the center of this lever $d$, by means of a pin, so that they are allowed to change position when the churn is in operation, to accommodate themselves to the changes of the dasher bearers.

E, E, represent the top pieces of the box, said pieces being provided with holes in them $(o, o,)$ through which the dasher bearers pass. $(e\ e)$ are side pieces secured to the box which are also provided with holes, through which passes the bar $(g)$ and secures the top to the box. The top bears upon the shaft $(a, a,)$ and keeps them in position when the churn is in operation.

In churning the cream is placed in the box A, and the top of the box is secured down firmly by means of the bar, $g$. The operator then takes hold of the lever, $d$, and by working it up and down, a backward and forward motion is communicated as will be seen to the dasher bearers and dashers. The cream is thus made to move backward and forward in the box and must in passing from one side to the other (a greater portion of it) pass through the holes in the dashers in a zigzag manner, breaking constantly on the sharp edges of the holes in the dasher which set at angles to each other, until sufficient agitation is produced to separate the caseous, and serous, parts of the cream thus producing butter.

Having thus fully described my invention what I claim as new and desire to secure by Letters Patent is—

The employment of the double concavo convex dashers, constructed, arranged, and operated, in the manner herein specified, and for the purpose set forth.

GEO. K. FARRINGTON.

Witnesses:
  JAMES KYLO,
  JOSEPH BEACHEM.